US012613313B2

(12) United States Patent (10) Patent No.: US 12,613,313 B2
Emadi et al. (45) Date of Patent: Apr. 28, 2026

(54) ACTION POTENTIAL BASED DETECTORS

(71) Applicant: Zadar Labs, Inc, Santa Clara, CA (US)

(72) Inventors: Mohammad Emadi, San Jose, CA (US); Ali Mostajeran, Morgan Hill, CA (US)

(73) Assignee: Zadar Labs, Inc., Campbell, CA (US)

(*) Notice: Subject to any disclaimer, the term of this patent is extended or adjusted under 35 U.S.C. 154(b) by 274 days.

(21) Appl. No.: 18/347,531

(22) Filed: Jul. 5, 2023

(65) Prior Publication Data

US 2024/0012110 A1     Jan. 11, 2024

Related U.S. Application Data

(60) Provisional application No. 63/367,958, filed on Jul. 8, 2022.

(51) Int. Cl.
| | |
|---|---|
| *G01S 7/41* | (2006.01) |
| *G01S 7/292* | (2006.01) |
| *G01S 13/04* | (2006.01) |

(52) U.S. Cl.
CPC ............ *G01S 7/414* (2013.01); *G01S 7/2922* (2013.01); *G01S 7/2926* (2013.01); *G01S 7/2927* (2013.01); *G01S 13/04* (2013.01)

(58) Field of Classification Search
CPC ...... G01S 7/414; G01S 7/2922; G01S 7/2926; G01S 7/2927; G01S 13/04
See application file for complete search history.

(56) References Cited

U.S. PATENT DOCUMENTS

| | | | |
|---|---|---|---|
| 2017/0059689 A1* | 3/2017 | Edge | G01S 5/0289 |
| 2019/0227156 A1* | 7/2019 | Santra | G01S 13/42 |
| 2019/0317191 A1* | 10/2019 | Santra | G06F 17/14 |
| 2021/0156992 A1* | 5/2021 | Nishikido | G01S 7/4008 |
| 2021/0389416 A1* | 12/2021 | Hong | G01S 7/0235 |
| 2022/0326375 A1* | 10/2022 | Wang | G01S 13/343 |
| 2022/0353697 A1* | 11/2022 | Saha | H04W 64/006 |
| 2022/0397638 A1* | 12/2022 | Schwark | G01S 13/34 |
| 2022/0413116 A1* | 12/2022 | Va | G01S 13/52 |
| 2023/0047069 A1* | 2/2023 | Cordie | G01S 7/354 |
| 2023/0053033 A1* | 2/2023 | Song | G01S 13/931 |

(Continued)

FOREIGN PATENT DOCUMENTS

JP      2002328164 A   * 11/2002

OTHER PUBLICATIONS

Pieter-Tjerk de Boer, "Integrating signals, and some moonbounce history," 2020, https://web.archive.org/web/20200117142340/http://www.pa3fwm.nl:80/technotes/tn10c.html (Year: 2020).*

(Continued)

*Primary Examiner* — William Kelleher
*Assistant Examiner* — Noah Yi Min Zhu
(74) *Attorney, Agent, or Firm* — UTULAW PC

(57)     ABSTRACT

Disclosed herein are systems and methods for action potential-based object detection. Received signals corresponding to multiple chirps can be grouped based on temporal or spatial attributes. Within these groups, successful detections can be identified when at least one signal satisfies an action potential threshold. The presence of a valid object is confirmed when the number of groups with successful detections satisfies a predetermined detection threshold.

17 Claims, 11 Drawing Sheets

(56) References Cited

U.S. PATENT DOCUMENTS

| 2023/0095228 A1* | 3/2023 | Wu | G01S 13/284 |
| | | | 342/112 |
| 2023/0305135 A1* | 9/2023 | Kuroda | G01S 7/414 |
| 2025/0130311 A1* | 4/2025 | Kishigami | G01S 7/026 |

OTHER PUBLICATIONS

Christian Wolff, "Pulse Integration," 2019, https://web.archive.org/web/20190923174515/http://www.radartutorial.eu:80/10.processing/Pulse%20Integration.en.html (Year: 2019).*

* cited by examiner

702

Obtain a plurality of signals reflected from objects

704

Group the plurality of signals based on temporal or spatial attributes

706

Successful detection?

708

Satisfy detection threshold?

710

Establish object detection

*30*

CLIENTS 33

SERVERS 32

DATABASES 34

Network(s) 31

SEC. 36

EXT SVCS 37

CONFIG 35

ACTION POTENTIAL BASED DETECTORS

CROSS-REFERENCE TO RELATED APPLICATIONS

The present application claims priority to U.S. provisional application No. 63/367,958, filed Jul. 8, 2022, and entitled "ACTION POTENTIAL BASED DETECTORS," which is hereby incorporated herein in its entirety for all purposes.

BACKGROUND

Field of the Art

The present embodiments relate to radar systems. More specifically, the present embodiments relate to object detection techniques in radar systems.

Discussion of the State of the Art

Optimal object detection and classification in radar systems requires the detection of a high number of points in an environment. Conventional approaches to increase the number of detected points is to reduce the threshold for power detecting. However, while a lower threshold may increase the probability of detection, it may also increase the number noisy points detected, thereby increasing the probability of false positives (also referred to as probability of false alarm).

Other techniques to address increasing the probability of detection while decreasing the probability of false positives may include adaptive thresholding based on Bayesian filtering, constant false alarm rate (CFAR) techniques, and the like. Such techniques consider assumptions such as gaussian white noise, impulsive noise, etc. However, these techniques are limited in certain environments, such as heavy and dense environments, in portable platforms, or in the presence of jammer or interference from other sensors in the environment. For example, a genuine target in a dense environment which falls below a threshold under such techniques, despite being an adaptive threshold, may be incorrectly classified as noise. Likewise, these techniques can incorrectly classify noise which appears above the threshold as a target (e.g., false positive).

Accordingly, there remains a need for improved techniques for object detection that can accurately detect and distinguish multiple objects in complex environments, while also being cost-effective and practical for various applications.

SUMMARY

Systems and methods in accordance with various embodiments of the present disclosure may overcome one or more of the aforementioned and other deficiencies experienced in conventional approaches to object detection in radar signal processing. In particular, various embodiments describe approaches to accurately detect objects in an environment, based on action potentials (e.g., reflected signals which exceed a predetermined threshold).

In an embodiment, a plurality of signals is received. The plurality of signals can correspond to a plurality of chirps. The plurality of signals can be grouped into a plurality of groups, wherein the groups may be temporally and/or spatially based. At least one group is determined to include a successful detection, the successful detection comprising at least one signal exceeding an action potential threshold. A valid object is detected when M number of groups out of N groups having a successful detection (e.g., having a minimum number of action potentials) exceeds the detection threshold.

In an embodiment, the action potential-based detection system can use at least two distinct thresholds in the process of object detection—the action potential threshold and the detection threshold. The action potential threshold is associated with the strength of individual signals within each group. The action potential threshold represents the minimum signal strength or signal-to-noise ratio that a received signal must exceed to be classified as a potential target within a group. The action potential threshold helps differentiate potential target signals from noise and interference on a group level. The detection threshold is related to the number of groups. The detection threshold specifies the minimum number of groups that must contain signals exceeding the action potential threshold for the system to consider the received signals as indicative of a valid target. By implementing these two thresholds, the action potential-based detection system effectively manages the trade-off between detection sensitivity and false alarm rate, enhancing the performance of the radar system.

In some aspects, the techniques described herein relate to a radar system for object detection, including: a radar transmitter, configured to emit a plurality of chirps; a radar receiver, configured to collect a plurality of signals reflected from objects within an environment, the plurality of signals being responsive to the plurality of chirps; a processor; and a memory device including instructions that, when executed by the processor, enables the radar system to: group the plurality of signals into a plurality of groups based on respective temporal or spatial attributes; determine whether at least one group includes a successful detection, the successful detection including at least one signal exceeding an action potential threshold; and determine whether a number of groups having a successful detection exceeds a detection threshold.

In some aspects, the techniques described herein relate to a radar system, wherein the instructions, when executed, further enables the radar system to: establish an object detection when the number of groups having a successful detection exceeds the detection threshold.

In some aspects, the techniques described herein relate to a radar system, wherein the instructions, when executed, further enables the radar system to: determine the plurality of signals are derived from pulses transmitted at different time intervals; and group the plurality of signals based on respective temporal attributes.

In some aspects, the techniques described herein relate to a radar system, wherein the instructions, when executed, further enables the radar system to: determine the plurality of signals originate from different spatial zones; and group the plurality of signals based on respective spatial attributes.

In some aspects, the techniques described herein relate to a radar system, wherein spatial attributes include azimuth, elevation, antenna elements, polarization, and a distribution of radars on a platform from which the plurality of signals are received.

In some aspects, the techniques described herein relate to a radar system, wherein temporal attributes include time domain characteristics of the plurality of signals, wherein the time domain characteristics include at least one of per chirp data, per subframe data, or per frame data.

In some aspects, the techniques described herein relate to a radar system, wherein the action potential threshold is associated with a minimum signal strength or signal-to-noise ratio required to classify a signal as a potential target within a group, and wherein the detection threshold is associated with a minimum number of groups containing signals exceeding the action potential threshold to classify received signals as indicative of a valid target.

In some aspects, the techniques described herein relate to a radar system, wherein the instructions, when executed, further enables the radar system to: integrate the plurality of chirps based on one of a subframe or frame.

In some aspects, the techniques described herein relate to a radar system, wherein the instructions, when executed, further enables the radar system to: integrate the plurality of groups based on one of coherent integration or non-coherent integration.

In some aspects, the techniques described herein relate to a radar system, wherein the instructions, when executed to integrate the at least one signal within the plurality of groups based on coherent integration, further enable the radar system to: average the at least one signal; and calculate power of the at least one signal based on a phase of the at least one signal.

In some aspects, the techniques described herein relate to a radar system, wherein the instructions, when executed to integrate the at least one signal within the plurality of groups based on non-coherent integration, further enable the radar system to: calculate power of the at least one signal without taking into account a phase of the at least one signal; and average the at least one signal.

In some aspects, the techniques described herein relate to a radar system, wherein the instructions, when executed, further enable the radar system to: determine a type of integration to be used for the plurality of groups based on at least one of environmental conditions, target characteristics, or interference and jamming conditions, wherein the environmental conditions include multipath effects, the target characteristics include target reflectivity, and the interference and jamming conditions include presence of other signal sources or reflectors in the environment.

In some aspects, the techniques described herein relate to a radar system, wherein the instructions, when executed, further enable the radar system to: adapt the plurality of groups and the detection threshold based on one of user feedback or feedback from system sensors.

In some aspects, the techniques described herein relate to a radar system, wherein the instructions, when executed, further enable the radar system to: calculate a probability of detection and the probability of false alarm based on a number of successful detections out of total groups.

In some aspects, the techniques described herein relate to a computer-implemented method, including: obtaining a plurality of signals reflected from objects within an environment, the plurality of signals being responsive to a plurality of chirps; grouping the plurality of signals into a plurality of groups based on respective temporal or spatial attributes; determining at least one group includes a successful detection, the successful detection including at least one signal exceeding an action potential threshold; and determining a number of groups having a successful detection exceeds a detection threshold.

In some aspects, the techniques described herein relate to a computer-implemented method, further including: establishing an object detection when the number of groups having a successful detection exceeds the detection threshold.

In some aspects, the techniques described herein relate to a computer-implemented method, further including: determining whether the plurality of signals are derived from one of pulses transmitted at different time intervals or originate from different spatial zones; and grouping the plurality of signals based on a respective attribute of derivation, wherein temporal signals are grouped based on temporal attributes, and spatial signals are grouped based on spatial attributes.

In some aspects, the techniques described herein relate to a computer-implemented method, further including: integrating the plurality of groups based on one of coherent integration or non-coherent integration.

In some aspects, the techniques described herein relate to a computer-implemented method, further including: determine a type of integration to be used for the plurality of groups based on at least one of environmental conditions, target characteristics, or interference and jamming conditions, wherein the environmental conditions include multipath effects, the target characteristics include target reflectivity, and the interference and jamming conditions include presence of other signal sources or reflectors in the environment.

In some aspects, the techniques described herein relate to a non-transitory computer readable storage medium storing instructions that, when executed by at least one processor of a computing system, causes the computing system to: obtain a plurality of signals reflected from objects within an environment, the plurality of signals being responsive to a plurality of chirps; group the plurality of signals into a plurality of groups based on respective temporal or spatial attributes; determine at least one group includes a successful detection, the successful detection including at least one signal exceeding an action potential threshold; and determine a number of groups having a successful detection exceeds a detection threshold.

Embodiments provide a variety of advantages. One benefit of the present invention is to reduce the computational burden memory requirement for a processing system, due to the layered decision-making for object detection. For example, embodiments described herein requires less memory and complexity, as the decision making for object detection is split into several layers.

Another benefit of the present invention is to improve accuracy of object detection in dense or rapidly changing environments, by grouping reflected signals, identifying action potentials, and ensuring the number of successful detections surpasses a detection threshold. For example, the probability of detection can be increased and the probability of false alarm can be reduced by determining detection based on grouping signals reflected from chirps, identifying action potentials from reflected signals per group, and determining that the number of groups with successful detections exceeds a detection threshold. In another example, embodiments described herein can improve accuracy of object detection in rapidly changing environments, for example, due to multipath effect over the spatial or temporal domain, the presence of interference and/or jammer in the environment, changes in target reflectivity during a scan time, among others.

Yet another benefit of the present invention the improvement in accuracy of object detection from received signals with very low power, improving detection accuracy.

Various other functions and advantages are described and suggested below as may be provided in accordance with the various embodiments.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The approaches described herein relate to systems and methods for implementing an action potential-based detection system. These approaches improve the ability to combine multiple capabilities or functions into a single hardware device, distribute functionality among any number of client and/or server components, and implement the system in various computing environments, including virtualized computing environments. To provide a better understanding of the approaches and their various embodiments, FIG. 1 illustrates an example environment in which aspects of the various embodiments can be implemented.

Conceptual Architecture

Figure 1:
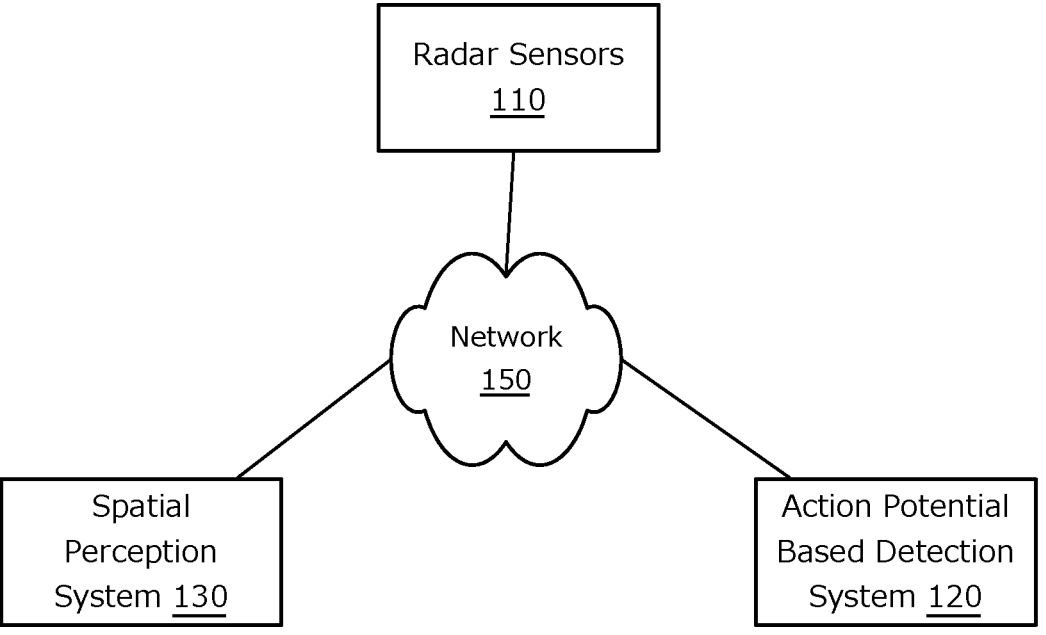
FIG. 1 illustrates an example environment in which aspects of the various embodiments can be implemented.

FIG. 1 illustrates an example environment in which aspects of the various embodiments can be implemented. It should be understood that reference numbers are carried over between figures for similar components for purposes of simplicity of explanation, but such usage should not be construed as a limitation on the various embodiments unless otherwise stated.

As shown, the environment may comprise radar sensor(s) 110, action potential-based detection system 120, and spatial perception system 130.

It should be known that the various systems and components described herein are exemplary and for illustration purposes only. Radar sensor(s) 110, action potential-based detection system 120, spatial perception system 130, and network 150 may be on a single system. In another embodiment, they may be on a distributed system. The components may be reorganized or consolidated, as understood by a person of ordinary skill in the art, to perform the same tasks on one or more other servers or devices without departing from the scope of the invention. Other components may be used, as would be readily understood by a person of ordinary skill in the art, without departing from the scope of the embodiments described herein.

Radar sensor(s) 110 is configured to transmit radar signals and receive reflected signals from objects in the environment, utilizing radar systems known in the art for receiving radar signals. In an embodiment, the radar signals comprise a plurality of chirps. In an embodiment, a "chirp" can refer to a signal in which the frequency increases ('up-chirp') or decreases ('down-chirp') with time. In some embodiments, a chirp is a signal with a frequency that varies with time.

Radar sensor(s) 110 may be used in automotive radar systems, where receiver antennas associated with automated driving systems collect signal data of objects in the vehicle's environment, such as other vehicles, pedestrians, and road signs. Other examples of radar sensor(s) 110 may include weather radar systems used by meteorologists to detect precipitation and other weather phenomena, or military radar systems used for surveillance, reconnaissance, and target tracking.

A corresponding plurality of reflected signals from the chirps is received. In some embodiments, this is referred to as raw radar-produced data, which may include a large amount of noise and false targets that are not relevant to the intended target or objects of interest. This data may consist of various types of information about the detected objects, such as their distance, speed, direction of movement, size, shape, and radar cross-section. In some embodiments, the radar-produced data may include points (e.g., targets), each represented by a set of coordinates that describe its location in the radar scan frame, as well as other information such as its radar cross-section, doppler value, and range from the radar sensor.

These reflected signals are processed by action potential-based detection system 120 to form groups based on their temporal or spatial characteristics. Action potential-based detection system 120 is described in greater detail in FIG. 2 below, but in general, action potential-based detection system 120 can improve object detection, particularly in dense environments.

For example, the reflected signals may be grouped into N temporal groups and/or spatial groups. In a specific example, the reflected signals may be grouped temporally based on per chirp, per subframe (e.g., a plurality of integrated chirps spanning a portion of a frame), or per frame (e.g., a plurality of integrated chirps spanning a frame). A chirp is a signal in which the frequency increases or decreases over time, and its reflected signals may form a single group. A subframe refers to a portion of a frame, which represents a complete cycle of the system operation.

The system then groups these signals based on their respective temporal attributes. For example, if the reflected signals are received within the same subframe or frame, they are grouped together. More specifically, per chirp can refer to the grouping of reflected signals based on individual chirp signals. Each chirp signal, which is a signal in which the frequency increases or decreases with time, may generate a set of reflected signals that are grouped together. Per subframe can refer to the grouping of reflected signals based on a subframe, which is a portion of a frame. A frame may refer to a complete cycle of the system operation, and a subframe may be a portion of this cycle. The reflected signals can be grouped together if they are received within the same subframe. Per frame can refer to the grouping of reflected signals based on a frame. In an example, the reflected signals can be grouped together if they are received within the same frame, which is a complete cycle of the system operation.

In another example, the reflected signals may be grouped spatially, such as by azimuth, elevation, doppler, polarization, etc. The azimuth and elevation refer to the horizontal and vertical angles, respectively, in the plane of the radar antenna pattern. The doppler shift gives information about the velocity of the object causing the reflection, while the polarization provides details about the orientation of the object causing the reflection.

In an embodiment, the decision to group the plurality of signals based on their temporal or spatial attributes can depend on the nature of the signals and the environment in which the detection system is operating. For example, temporal attributes are typically chosen when the signals are derived from pulses transmitted at different time intervals, such as when the system is monitoring the changes in objects' location or motion over time. Grouping based on temporal attributes, such as per chirp data, per subframe data, or per frame data, is especially effective when tracking moving objects or when the environmental conditions vary with time, necessitating a time-sensitive approach to object detection. Spatial attributes can be used when the signals originate from different spatial zones. The spatial attributes can include azimuth, elevation, doppler, polarization, or even a distribution of radars on a platform from which the signals are received. This approach is particularly useful when the objective is to map out the objects in a particular environment, like in autonomous vehicle systems, or when the spatial disposition of objects is of interest, such as in surveillance systems.

Once the reflected signals are grouped, each group is evaluated to determine if a successful detection has occurred. A successful detection can occur when at least one reflected signal within a group satisfies (e.g., exceeds) an action potential threshold, indicating a potential target. This system uses two distinct thresholds: the action potential threshold and the detection threshold. The action potential threshold represents the minimum signal strength required for a potential target within a group, while the detection threshold specifies the minimum number of groups containing potential targets required for a valid target detection.

Said another way, the action potential threshold is associated with the strength of individual signals within each group. The action potential threshold represents the minimum signal strength or signal-to-noise ratio that a received signal must satisfy to be classified as a potential target within a group. A reflected signal is an action potential (also referred to as complete action potential) when it satisfies an action potential threshold. In this way, the action potential threshold helps differentiate potential target signals from noise and interference on a group level.

The detection threshold is related to the number of groups. The detection threshold specifies the minimum number of groups that must contain signals exceeding the action potential threshold for the system to consider the received signals as indicative of a valid target. By implementing these two thresholds, the action potential-based detection system effectively manages the trade-off between detection sensitivity and false alarm rate, enhancing the performance of the radar system.

In another embodiment, a successful detection may encompass a plurality of action potentials, for instance, a quantity that exceeds a predetermined threshold, within a group. This scenario may occur when the group comprises a subframe or frame of reflected signals, providing a more granular level of detection. In the above referenced example, the system determines whether the source of the reflected signals is a valid object or merely noise. This determination is based on whether the number of groups, denoted as M, with successful detections surpasses a predetermined detection threshold. More specifically, in accordance with an embodiment, if M out of N groups have successful detections that exceed the predetermined detection threshold, the source of the reflected signals is classified as a valid object. In other words, the system is designed to classify the source as noise, or a false alarm, when M is less than the detection threshold. This feature aids in reducing false positives and improving the overall reliability of the system.

It should be noted that various other embodiments may implement similar or different criteria for successful detections and object classification, providing flexibility and adaptability to various operating conditions and requirements. For example, in an embodiment, when the number of groups having a successful detection exceeds the detection threshold, the system establishes an object detection. The process of establishing object detection includes marking the detected object and its associated data for further processing or notifying the user or another system component about the detection.

Spatial perception system 130 may comprise systems which can utilize objects that are detected based on action potentials from reflected signals from an environment. More specifically, spatial perception system 130 can be integrated into various types of systems. In one embodiment, it may be incorporated into autonomous vehicle perception systems or other driver assistance systems. These systems can utilize the detected objects to navigate or assist in navigation within the environment.

In other embodiments, the spatial perception system 130 can be part of other systems such as beamforming modules or systems that utilize angle of arrival estimation. These systems can use the detected objects to enhance their functionality, such as improving signal reception or transmission. For example, a beamforming module within the spatial perception system 130 can process points from the detected objects. This processing can be done in a round-robin fashion, where each point is selected and processed in turn. This method allows for efficient processing of the detected objects.

Network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network, and any suitable link for connecting the various systems and databases described herein.

The network 150 connects the various systems and computing devices described or referenced herein. In particular embodiments, network is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network. In an embodiment, action potential-based detection system 120 can be within a network (e.g., in communication with or associated with network 150). In another embodiment, action potential-based detection system 120 can be on the network edge (e.g., contained inside a radar sensor which is in communication with network 150).

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Generally, the techniques disclosed herein may be implemented on hardware or a combination of software and hardware. For example, they may be implemented in an operating system kernel, in a separate user process, in a library package bound into network applications, on a spe-cially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 2:
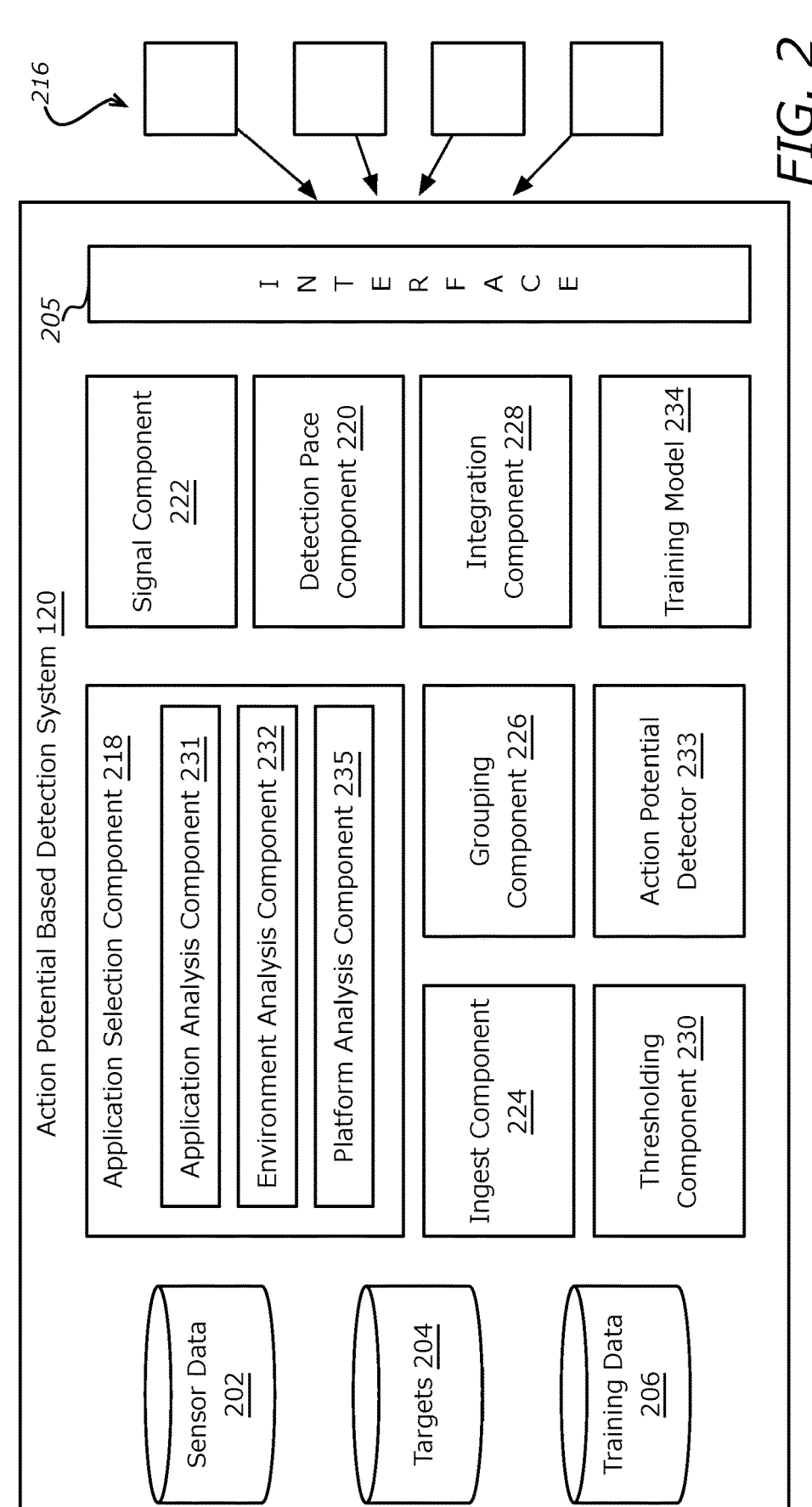
FIG. 2 illustrates an example of an action potential-based detection system in accordance with an exemplary embodiment.

FIG. 2 illustrates an example of an action potential-based detection system 120 in accordance with an exemplary embodiment. In this example, the action potential-based detection system 120 may comprise interface 205, radar data sources 216, application selection component 218, detection pace component 220, signal component 222, ingest component 224, grouping component 226, integration component 228, thresholding component 230, action potential detector 233, and training model 234.

Action potential-based detection system 120 may also include or be in communication with one or more data stores, including, for example, sensor data store 202, target data store 204, and training data store 206. It should be noted that although the data stores are shown as separate data stores, data from the data stores can be maintained across fewer or additional data stores. The data stores can be accessed by each of the various components in order to perform the functionality of the corresponding component. Other components, systems, services, etc. may access the data stores. Although action potential-based detection system 120 is shown as a single system, the system may be hosted on multiple server computers and/or distributed across multiple systems. Additionally, the components may be performed by any number of different computers and/or systems. Thus, the components may be separated into multiple services and/or over multiple disparate systems to perform the functionality described herein.

Sensor data received from an environment may be stored in sensor data store 202. In accordance with various embodiments, the environment can refer to the surrounding area or conditions in which the system operates. This can encompass both the physical and the electromagnetic conditions that the system encounters. More specifically, the environment can include various physical elements such as buildings, vehicles, people, and natural features like trees and hills. These elements can reflect, absorb, or otherwise interact with the signals transmitted by the system, resulting in the reflected signals that the system receives and processes. In this manner, the environment can also include the electromagnetic conditions that the system encounters. This can include the presence of other signals, such as those from other radar systems, radio broadcasts, or natural sources. These signals can interfere with the system's signals, creating noise that the system must filter out to accurately detect and classify objects. In one embodiment, the environment can be a city street, with buildings, vehicles, and pedestrians. In another embodiment, the environment can be a rural area, with trees, hills, and few buildings or vehicles. In yet another embodiment, the environment can be a highway, with multiple lanes of fast-moving vehicles. In other words, the environment is the context in which the system operates, and it can vary widely depending on the specific application of the system.

Sensor data may be received from various sources such as an antenna, radar, or other sensors. These devices capture signals from the environment and convert them into data that can be processed and analyzed by the system. In this manner, the sensor data may comprise reflected signals from the environment. These reflected signals are responses to transmitting signals, such as chirps, that are sent into the environment. A chirp is a type of signal in which the frequency increases or decreases over time.

In one embodiment, the sensor data may also include various data associated with the point from which the signals are reflected. For example, this data may include the azimuth, which is the horizontal angle or direction of a point; the elevation, which is the vertical angle or direction of a point; and the Doppler, which is the change in frequency or wavelength of a wave in relation to an observer who is moving relative to the source of the wave. In other words, the sensor data provides a comprehensive set of information about the environment, enabling the system to accurately detect and classify objects.

Generally, the present invention involves the detection and classification of various entities within an environment. These entities can be referred to as, for example, points, targets, or objects. In an embodiment, a point can refer to a specific location in the environment where a signal is reflected. In an embodiment, a point can be associated with a physical object or target. A target can refer to an object in the environment that the system is specifically designed to detect. Targets can include various types of objects, such as aircraft, vehicles, ships, and pedestrians, among others.

In an embodiment, information about a point, which is associated with a target, can be stored in target data store 204. Target data store 204 can hold a variety of information about a detected target, including the position of the target, the velocity of the target, the size of the target, and other properties. In certain embodiments, target data store 204 may store additional information about the detected points. This additional information can include the confidence level of the detection, which indicates the system's certainty that the detected point is indeed a target, and any classification or identification information, which provides further details about the nature of the target. In other words, the system can generate radar-produced data, such as from imaging radar sensors. This data can include the detection of a plurality of points that are present in the environment within any given radar scan. A radar scan can refer to a complete cycle of the radar system's operation, during which it transmits signals, receives the reflected signals, and processes these signals to detect and classify targets.

Training data can be stored in training data store 206. Training data can include user feedback, feedback from other sensors, etc.

User feedback can include, for example, input or responses provided by users of the system. User feedback can take various forms depending on the specific implementation of the system. For instance, users can provide feedback on the system's performance, such as the accuracy of object detection, the speed of detection, or the system's ability to distinguish between different types of objects. In an embodiment, user feedback can also include suggestions for improving the system. For example, users might suggest changes to the system's parameters, such as the thresholds for detection or the criteria for grouping sensor data. In an embodiment, user feedback can be collected through a user interface. This interface can provide various options for users to provide their feedback, such as text fields for comments, sliders for rating the system's performance, or checkboxes for selecting options. In an embodiment, user feedback can be used to adjust the system's parameters and improve its performance.

Feedback from other sensors can include, for example, data or information provided by additional sensors that are part of, or connected to, the system. This feedback can be used to enhance the system's understanding of the environment and improve its performance. In an embodiment, feedback from other sensors can include a wide range of data depending on the types of sensors used. For instance, if the system includes temperature sensors, the feedback can include data about the temperature of the environment. If the system includes light sensors, the feedback can include data about the lighting conditions. In an embodiment, feedback from other sensors can also provide information about the performance of the system itself. For example, if the system includes sensors that monitor the power levels of the transmitted signals, the feedback from these sensors can provide information about the efficiency of the system's signal transmission. In one embodiment, feedback from other sensors can be integrated with the sensor data from the main sensor (e.g., the radar) to provide a more comprehensive understanding of the environment. This can improve the system's ability to detect and classify objects.

Ingest component 224 is operable to receive through interface 205 a selection of radar data sources 216 for sensor data, such as radar-produced data. In various embodiments, interface 205 may include a data interface and service interface which may be configured to periodically receive data sets, requests, and/or any other relevant information comprising or relating to radar-produced data, for example, sensor data.

Sensor data may include signals from an environment (e.g., reflected from chirps, subframes of chirps, frames of chirps, etc., transmitted into the environment).

In an embodiment, the signals received from the environment may include action potentials (also referred to as complete action potential). An action potential may comprise a reflected signal which exceeds a predetermined threshold (e.g., a minimum power level, etc.). Such data from the environment may be collected from imaging radar sensors or radar antenna.

Interface 205 can include any appropriate components known or used to receive requests or other data from across a network, such as may include one or more application programming interfaces (APIs) or other such interfaces for receiving such requests and/or data. The radar data sources 216 can include, for example, various radar data sources. Examples of radar data sources may include portable radar systems, radar antennas, configuration files comprising radar data, and so forth. In certain embodiments, radar data sources 216 may include a plurality of periodic radar scans of a particular environment.

Application selection component 218 is operable to determine the optimal pace of object detection and selects the appropriate layer of signals for a given application of the system, the type of environment, the type of platform, etc. In an embodiment, the term "optimal" can refer to the pace that maximizes the system's performance according to certain metrics, such as accuracy, speed, or efficiency. Application selection component 218 may comprise several subcomponents.

In an embodiment, application selection component 218 comprises application analysis sub-component 231. This sub-component analyzes the specific needs of the application in which the system is being used. For example, it may determine whether the application requires very fast, fast, or slow-paced detection. This determination can be based on various factors, such as the maximum range of a point (e.g., target), the randomness of the radar cross section (RCS) of the target, or the optimal pace of object detection on a frame-by-frame basis.

In an embodiment, application selection component 218 comprises environment analysis sub-component 232. This sub-component assesses the characteristics of the environment in which the system is operating. For example, it may evaluate the size of the environment, the presence of obstacles, or the level of noise or interference. This information can be used to adjust the pace of object detection accordingly. [Figure needs to be updated to show subcomponents]

In an embodiment, application selection component 218 comprises platform analysis sub-component 235. This sub-component examines the type of platform on which the system is installed. For example, it may consider whether the platform is stationary or mobile, its speed of movement, or its orientation. This information can influence the selection of the detection pace.

In an embodiment, based on the analyses performed by these sub-components, the application selection component 218 selects one of the three layers of signals to be transmitted into the environment: the pulse-chirp layer 302 for very fast-paced detection, the subframe layer 304 for fast-paced detection, or the frame layer 306 for slow-paced detection. This selection is then communicated to the detection pace component 220 and the signal component 222, which adjust their operations accordingly.

Detection pace component 220 is operable to adjust the pace of object detection based on the selection made by application selection component 218. In an embodiment, detection pace component 220 can select different paces of detection, such as very fast, fast-paced, or slow-paced detection.

In some embodiments, "very fast" may refer to a pace that satisfies a certain high threshold, "fast" may refer to a pace that satisfies a lower threshold, and "slow" may refer to a pace that falls below a specific threshold. It should be noted that the terms "very fast, fast, and slow-paced detection" are utilized here primarily for illustrative purposes and represent different rates of detection. These terms are not intended to be restrictive and can be replaced with a variety of other descriptors that also denote the pace of detection in different application contexts.

For example, "very fast" detection could also be represented by terms such as "high-speed", "accelerated", "rapid", "swift", or "immediate" detection, which emphasize the need for near instantaneous processing and recognition of detected signals. Similarly, "fast" detection may be alternatively expressed as "speedy", "prompt", "quick", "fast-acting", or "rapid progression" detection, signifying a high but not immediate rate of detection, thus providing some leeway for processing. Conversely, "slow-paced" detection could be substituted with phrases like "gradual", "delayed", "slow-progress", "measured", or "leisurely-paced" detection, indicating a much more relaxed detection rate, and permitting more in-depth processing of the signals.

Threshold can refer to a predetermined value or limit that is used to guide the decision-making process of the system. The specific values of these thresholds can vary depending on the specific implementation of the system and the characteristics of the environment. More specifically, a "high threshold" refers to a value that is relatively high in the context of the system's operation. For example, in the context of detection pace, a high threshold might correspond to a high frequency of object detection. If the system is able to detect objects at a frequency that meets or exceeds this high threshold, it might be considered to be operating at a "very fast" pace. Continuing with this example, a "lower threshold" can refer to a value that is relatively low in the context of the system's operation. For instance, in the context of detection pace, a lower threshold might correspond to a lower frequency of object detection. If the system is able to detect objects at a frequency that meets or exceeds this lower threshold, but is below the high threshold, it might be considered to be operating at a "fast" pace. In one embodiment, a "certain threshold" refers to a specific value that is used to guide the system's operation. This threshold can be set based on various factors, such as the requirements of the application, the characteristics of the environment, or the capabilities of the system. For example, in the context of detection pace, a certain threshold might be set to distinguish between "slow" and "fast" paces of detection. If the system's frequency of object detection is below this certain threshold, it might be considered to be operating at a "slow" pace.

Detection pace may correspond with the manner of transmitting signals (e.g., by signal component 222). For example, very fast-paced detection may be selected for applications where the maximum range of a point (e.g., target) is very small. In such cases, the signal component 222 sends pulse-chirp layer signals into the environment.

Signal component 222 is operable to transmit signals into the environment based on the pace of detection selected by the detection pace component 220.

For example, for very fast-paced detection, signal component 222 sends pulse-chirp layer signals into the environment. These signals may be transmitted via interface 205.

In another example, for fast-paced detection, which may be selected in applications where there is randomization on the radar cross section (RCS) of the target, signal component 222 sends subframe layer signals into the environment. When a subframe of chirps is transmitted to the environment, the environment may respond with reflected subframe signals. In this case, subframe layer signals comprise a plurality of transmitted chirps that are integrated, spanning a portion of the frame.

In yet another example, for slow-paced detection, which may be selected in applications where object detection is optimal at a frame-by-frame basis, signal component 222 sends frame layer signals into the environment. When a frame of chirps is transmitted to the environment, the environment may respond with reflected frame signals.

Grouping component 226 is operable to group the received sensor data. In an embodiment, sensor data may be grouped temporally, spatially, or a combination thereof.

In an embodiment, the decision to group the plurality of signals based on their temporal or spatial attributes can depend on the nature of the signals and the environment in which the detection system is operating. For example, temporal attributes are typically chosen when the signals are derived from pulses transmitted at different time intervals, such as when the system is monitoring the changes in objects' location or motion over time. Grouping based on temporal attributes, such as per chirp data, per subframe data, or per frame data, is especially effective when tracking moving objects or when the environmental conditions vary with time, necessitating a time-sensitive approach to object detection. Spatial attributes can be used when the signals originate from different spatial zones. The spatial attributes can include azimuth, elevation, doppler, polarization, or even a distribution of radars on a platform from which the signals are received. This approach is particularly useful when the objective is to map out the objects in a particular environment, like in autonomous vehicle systems, or when the spatial disposition of objects is of interest, such as in surveillance systems.

With temporal grouping, the sensor data may be grouped based on temporal attributes. Temporal attributes can include per chirp data (e.g., individual reflected signal corresponding to individual transmitted chirps into the environment), per subframe data (e.g., a plurality of reflected signals corresponding to a subframe of chirps transmitted into the environment), per frame data (e.g., a second plurality of reflected signals corresponding to an entire frame of transmitted chirps), and so forth.

With spatial grouping, the sensor data may be grouped based on spatial attributes. Spatial attributes can include azimuth, elevation, antenna elements, polarization, and the distribution of radars on a platform from which the signals are received, among others. In another embodiment, sensor data may be grouped based on other characteristics, such as environmental characteristics, platform characteristics, etc. For a given set of received sensor data, there may be N number of groups belonging to a total group. In an embodiment, the group size may be preconfigured, such as small, large, a plurality of small groups, and so forth.

Integration component 228 is operable to integrate the grouped data. For example, coherent integration or non-coherent integration may be applied to the grouped data to optimize the signal to noise ratio (SNR). For example, noise in the signal may be reduced and/or the signal can be extracted (e.g., achieving a high SNR value). This primes the signal for fast paced or slow-paced detection.

In some embodiments, integration component 228 determines the type of integration to be used based on various factors. These factors could be environmental conditions, including but not limited to weather conditions, terrain properties, and multipath effects; characteristics of the target, such as size, shape, material, and velocity; and interference and jamming conditions, as determined by the presence and characteristics of other signal sources or reflectors in the environment. For instance, in environments with severe multipath effects or high-interference, the system may prefer non-coherent integration to handle phase inconsistencies or interference robustly. On the other hand, for small, high-speed targets, the system might opt for coherent integration to maintain phase information and provide better target resolution.

Thresholding component 230 is operable to determine two types of thresholds for object detection: an action potential threshold and a detection threshold.

The action potential threshold is applied at the level of individual groups of sensor data, where a successful detection within a group implies that at least one signal in the group has exceeded this threshold. In short, the action potential threshold represents a minimum signal strength or signal-to-noise ratio that a received signal surpasses to be identified as a potential target within a group, thereby aiding in differentiating potential target signals from background noise.

The detection threshold is a system-level threshold, set as a minimum value (M) for a total group (e.g., out of a total of N groups based on a characteristic, such as per chirp, per subframe, azimuth, polarization, etc.). The detection threshold is concerned with the total number of groups that contain successful detections. If M out of N successful detections are found, an object is detected (e.g., the source of the reflected signal may be classified as a valid target). Otherwise, if less than M out of N successful detections are found, the situation is identified as noise.

Accordingly, in accordance with various embodiments, the action potential threshold and the detection threshold play distinct roles. The action potential threshold, associated with a minimum signal strength or signal-to-noise ratio, classifies a signal as a potential target within a group. On the other hand, the detection threshold, associated with a minimum number of groups containing signals exceeding the action potential threshold, classifies received signals as indicative of a valid target. By utilizing these two thresholds, the thresholding component 230 can optimize the balance between detection sensitivity and false alarm rate, significantly improving the overall performance and reliability of the radar system. The action potential threshold enables noise rejection and interference mitigation at the group level, while the detection threshold provides a system-wide measure for confirming object detection, reducing the chance of false positives. This two-tier thresholding mechanism ensures that the radar system can effectively cope with varying environmental and operational conditions.

Action potential detector 233 is operable to determine the number of successful detections per group, based on action potentials per chirp, per subframe, or per frame. For example, when M out of N temporal groups (for example, subframes or frames comprising transmitted integrated chirps) receive corresponding subframes (or frames) of reflected signals which comprise a threshold number of complete action potentials, an object is detected. In another example, when M out of N spatial groups (for example, groups based on azimuth, etc.) have successful detections (e.g., a threshold number of action potentials per chirp, per subframe, per frame, etc.) an object is detected. Otherwise, when there are less than M successful detections out of N groups, a false positive (e.g., noise) is detected.

In an embodiment, training model 234 can use the training data to learn to group sensor data, determine detection pace, and/or determine integration for action potential-based detection of objects. In an embodiment, grouping involves categorizing or clustering the sensor data based on certain characteristics or criteria. For example, the model might learn to group sensor data based on the location, time, or type of signals. This can help the system to organize the sensor data more effectively and improve the accuracy of object detection.

In an embodiment, training model 234 can learn to determine the pace of detection. The pace of detection can refer to the speed or frequency at which the system detects objects. By learning from the training data, the model can adjust the pace of detection to optimize the system's performance. For instance, in a busy environment with many objects, the model might learn to increase the pace of detection.

In an embodiment, training model 234 can learn to determine the integration for action potential-based detection of objects. Integration can involve combining or processing the sensor data to generate action potentials, which are used for object detection. The model can learn how to best integrate the sensor data based on the training data. For example, it may learn to integrate the data in a certain way to maximize the action potentials for certain types of objects. In another example, it may learn to integrate a plurality of chirps based on a subframe or frame.

Figure 3:
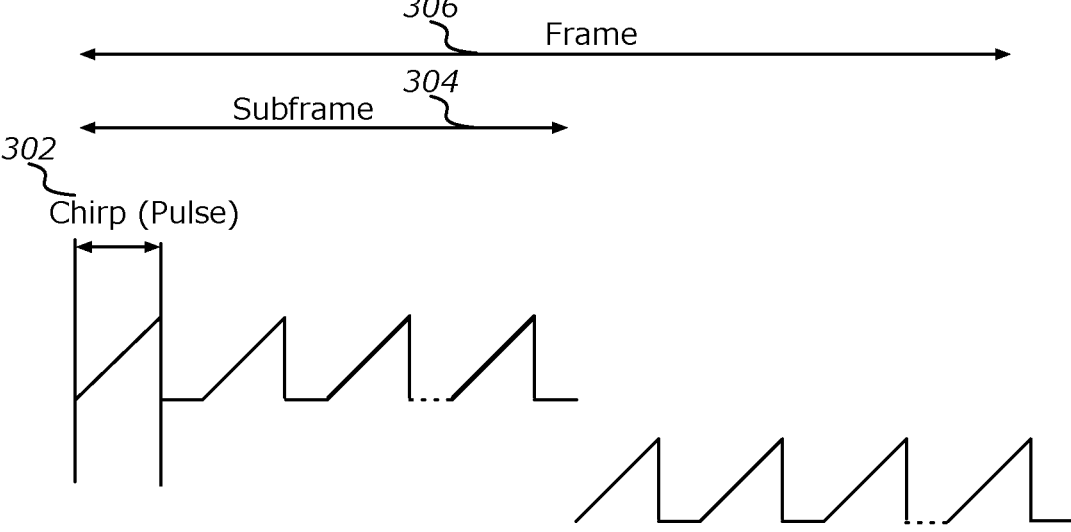
FIG. 3 illustrates an example of various types of signals that can be transmitted into an environment for object detection in accordance with various embodiments.

FIG. 3 illustrates an example of various types of signals that can be transmitted into an environment for object detection in accordance with various embodiments. These signals, also referred to as chirps or pulses, are reflected back and received by a radar system. The reflected signals are processed as action potentials, which are specific types of signals used for object detection. An action potential is a processed form of the reflected signals and is considered as such when it exceeds a certain threshold, indicating the presence of an object.

The threshold for an action potential can be set based on various factors, such as the requirements of the application, the characteristics of the environment, or the capabilities of the system. For instance, a reflected signal might be considered an action potential when it exceeds a predetermined power level, indicating that the signal has reflected off an object rather than just being noise or interference.

FIG. 3 further categorizes the signals into three layers: pulse-chirp layer 302, subframe layer 304, and frame layer 306. Each layer represents a different pace of object detection, which can be selected based on the specific needs of the application.

Pulse-chirp layer 302 signals are used for very fast detection of objects. These signals are ideal for applications where the maximum range of a point is very small or where changes in the environment occur quickly, for example, surveillance market applications, autonomous mobile robots or surround vehicle view (e.g., where range is within 20 meters), vital sign monitoring, among others. Pulse-chirp layer 302 signals may also be sent in applications where a change in the environment occurs quickly, for example, a heartbeat rate in vital sign monitoring), the occurrence of jammer in the same frequency range, among others.

In an embodiment, each chirp sent through a pulse-chirp layer 302 signal (without any integration with other chirps) has a predetermined signal to noise ratio (SNR) that is sufficient to be detected. For example, the environment is observed for a minimum duration in which a chirp (also referred to as pulse or coded pulse) is sent to the environment and a reflected signal (e.g., action potential, also referred to as complete action potential) is received from the environment. Such duration may span, for example, a few microseconds to several hundred microseconds. In yet another embodiment, each transmitted chirp can have a different frequency, bandwidth, polarization, etc. from another transmitted chirp to increase randomness to the environment.

Object detection may then be performed on each complete action potential responding to each corresponding chirp. For example, a complete action potential corresponds to a single successful detection (e.g., a positive detection), where the complete action potential comprises a reflected signal which reaches or exceeds a predetermined level (e.g., power, etc.). A number (M) of complete action potentials from a group (N) of reflected signals received that exceeds a predetermined threshold indicates object detection (e.g., a target is present). Meanwhile, a number (M) of complete action potentials that is less than the predetermined threshold out of the group N indicates false alarm (e.g., noise). In an embodiment, groupings of N reflected signals may be temporally based, such as by reflected signals per chirp, per subframe, per frame base, etc.

Subframe layer 304 signals are used for fast-paced detection of objects. In an embodiment, a subframe of signals comprises a plurality of transmitted chirps that are integrated, the plurality of chirps spanning a portion of the frame. The plurality of transmitted chirps can be integrated based on a particular behavior of the chirps. For example, a particular behavior may include time division multiplexed-multiple input, multiple output (TDM-MIMO), frequency change, bandwidth (BW) change, chirp repetition frequency, different receiver elements, polarization, phase coding, bandwidth, and so forth.

Fast paced detection using subframe layer 304 signals may be ideal for situations where there is randomization on the radar cross-section (RCS) of the target or for reducing the multipath effect. A subframe of signals comprises a plurality of transmitted chirps that are integrated, spanning a portion of the frame. When a subframe of chirps are transmitted to the environment, the environment may respond with reflected subframe signals (e.g., a plurality of reflected signals).

Object detection based on subframe layer 304 signals may be performed on the reflected subframe signals. For example, when the reflected subframe signals includes a predetermined number of or exceeds a predetermined threshold of complete action potentials, the reflected subframe signals is considered a successful detection. When M number of successful detections (e.g., M number of reflected subframes comprising at least a threshold amount of complete action potentials) from a group of N reflected subframes exceeds a predetermined detector threshold, an object is detected.

Frame layer 306 signals are used for slow-paced detection of objects. These signals are ideal for applications where object detection is optimal at a frame-by-frame basis. A frame layer 306 signal comprises all of the chirps transmitted during the frame, wherein the chirps are integrated. The chirps may be integrated based on behavior of the chirps, such as TDM-MIMO, frequency or bandwidth changes, chirp repetition frequency, different receiver elements, polarization, phase coding, bandwidth, among others. In embodiment, a frame of reflected signals (e.g., a reflected frame) which includes a predetermined number of complete action potentials or exceeds a predetermined threshold of complete action potentials is considered a successful detection.

Object detection is then determined based on a plurality of frames are. For example, when M number of successful detections (e.g., M number of reflected frames comprising at least a threshold amount of complete action potentials) from a group of N frames exceeds a predetermined detection threshold, an object is detected.

In each scenario, the determination of object detection can be based on at least one observed snapshot of the environment, which can be time-based. This snapshot, referred to as a 'frame', may encompass a sequence of signals transmitted into the environment. Object detection can be performed by analyzing the number of successful detections within this frame. A successful detection is defined as a situation where the reflected signals include or exceed a predetermined threshold of 'complete action potentials'. A 'complete action potential' is a processed form of the reflected signals, which are waveforms received from the environment in response to the transmitted signals. It is a signal that exceeds a certain threshold, indicating the presence of an object. If the number of successful detections surpasses a predetermined detection threshold, an object is detected.

Figure 4:
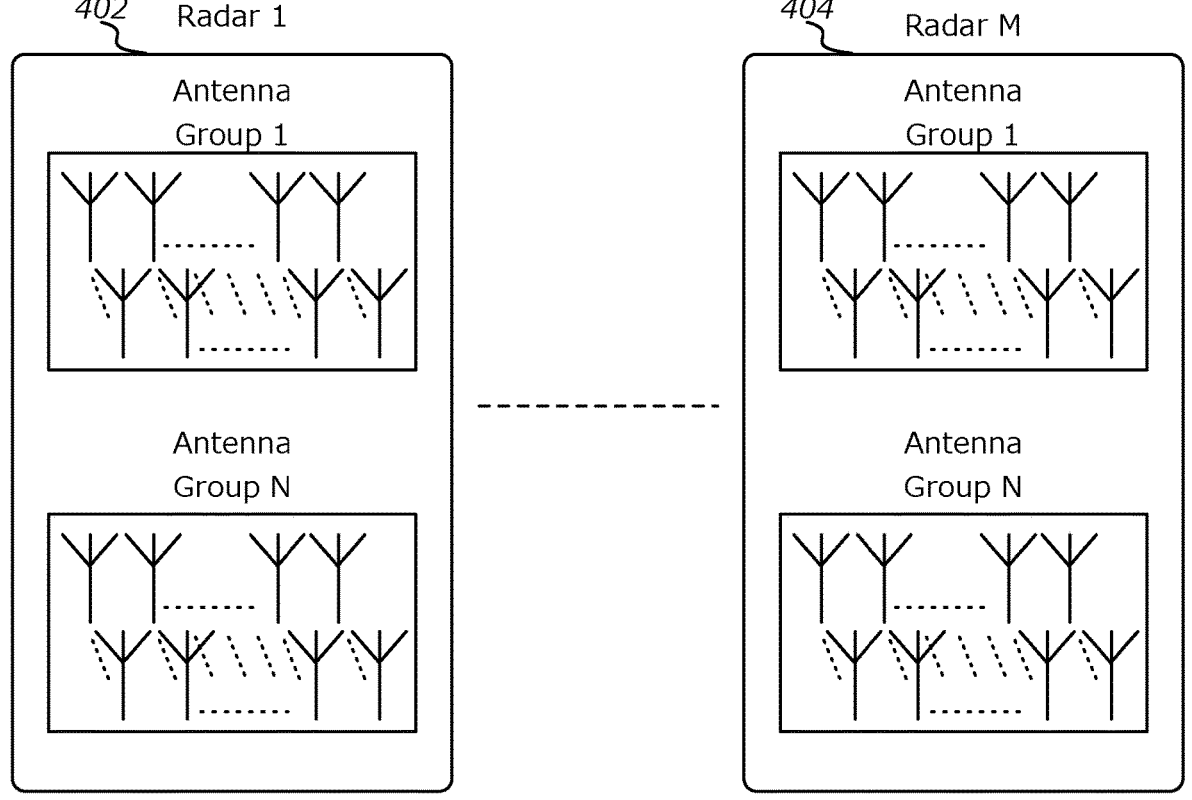
FIG. 4 illustrates an example diagram for grouping signals of an action potential-based detection system, in which aspects of the various embodiments can be implemented.

FIG. 4 illustrates an example diagram for grouping signals of an action potential-based detection system in accordance with various embodiments. As shown, FIG. 4 illustrates that reflected signals may be grouped temporally, spatially, or a combination thereof.

Temporal grouping may involve arranging reflected signals based on temporal characteristics, such as per chirp, per subframe, or per frame data, thereby structuring the data in line with the time of reception or emission of the signals.

Spatial grouping may involve the aggregation of signals, for instance, chirps, into groups in accordance with spatial properties. These spatial properties may include parameters such as azimuth, elevation, polarization, different types of antennas, arrangement or distribution of antennas, and antenna pattern diversity.

The grouped reflected signals may be used to determine whether an object is detected.

For instance, spatial integration can be performed by arranging the reflected signals according to several antenna groups (e.g., from antenna group 1 through antenna group N). These groups can be defined by specific characteristics such as type of antenna, specific antenna pattern diversity, among others. A plurality of radars 402 and 404 receive reflected signals from these antenna groups. For each radar, receiving successful detections from M out of N antenna groups can be classified as a detected object. Successful detection is characterized by a certain number of action potentials present in the reflected signals received by an antenna group. A reflected signal can be deemed as an action potential (also referred to as a complete action potential) when it exhibits certain characteristics, for instance, when it exceeds a predetermined power level. If successful detections are observed from fewer than M out of N antenna groups, the origin of the reflected signals is classified as noise, ruling out the presence of an object.

Moreover, the example further demonstrates the process of calculating the number of radars associated with successful object detection from the plurality of radars. If a predefined threshold number of radars report successful object detection, the overall object detection is considered valid. In contrast, if this threshold is not met, the detection is regarded as a false alarm or noise, ensuring the system's accuracy and reliability.

Figure 5:
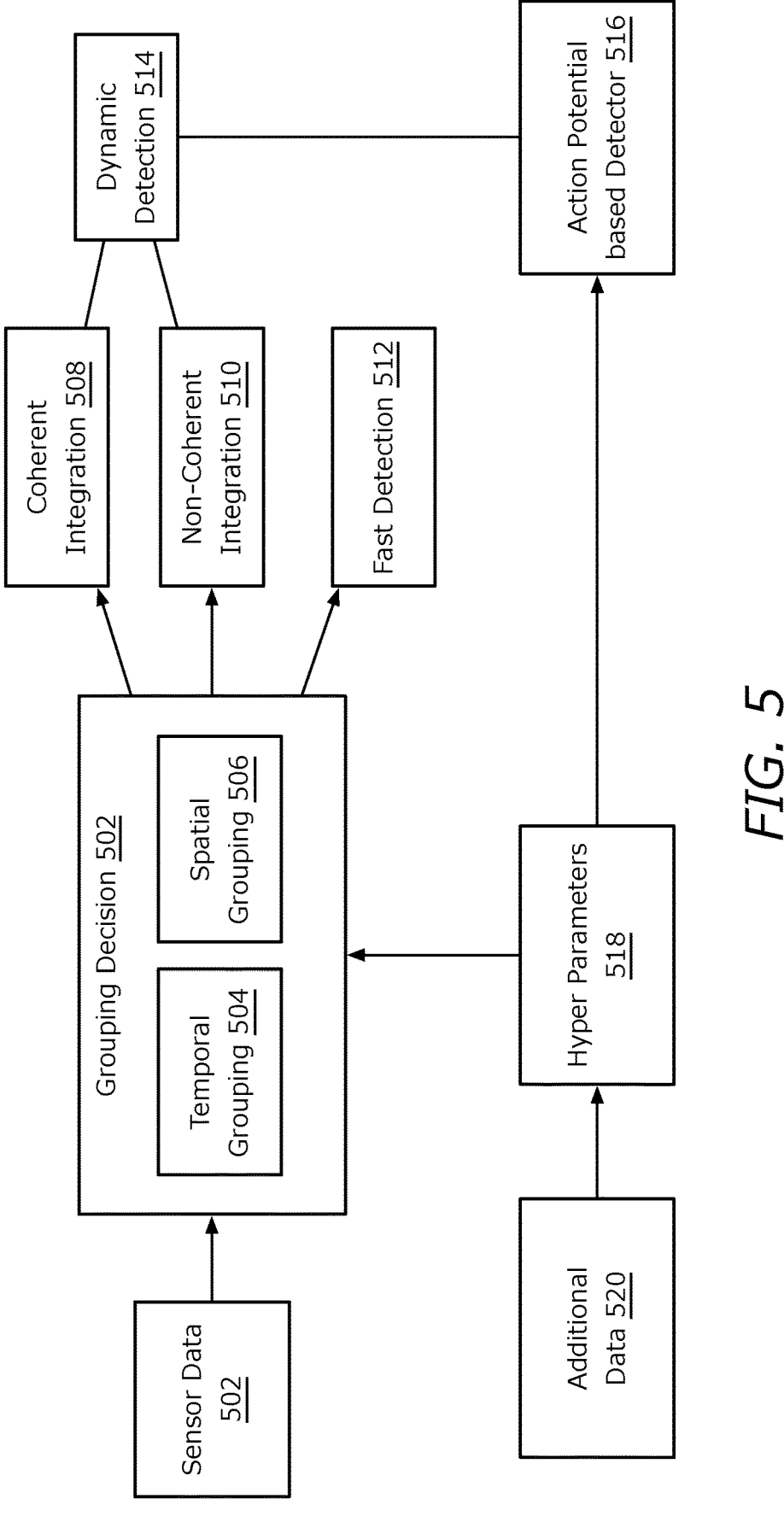
FIG. 5 illustrates an example process of an action potential-based detection system in accordance with various embodiments.

FIG. 5 illustrates an example process of an action potential-based object detection system in accordance various embodiments can be implemented. In this example, sensor data is received 502 from various sensors such as radar or antennas. This sensor data may include reflected signals from the environment due to the transmission of signals into it. Various data points associated with the reflected signals may be included in the sensor data such as azimuth, elevation, and Doppler shift.

The sensor data may be grouped based on a grouping decision. In an embodiment, the sensor data may be temporally grouped 504, spatially grouped 506, grouped based on other characteristics (e.g., environmental, platform, etc.), or a combination thereof. For instance, sensor data grouped per chirp includes individual reflected signals corresponding to individual transmitted chirps. Conversely, sensor data grouped per subframe or frame comprises a collection of reflected signals corresponding to a subframe or entire frame of transmitted chirps. In certain embodiments, the system adapts the group of the plurality of signals and the detection threshold based on user feedback or feedback from system sensors. This adaptive nature of the system allows it to stay responsive to changes in its operating environment and user requirements.

With temporal grouping, the sensor data may be grouped by per chirp (e.g., individual reflected signal corresponding to individual transmitted chirps into the environment), by per subframe (e.g., a plurality of reflected signals corresponding to a subframe of chirps transmitted into the environment), by frame (e.g., a second plurality of reflected signals corresponding to an entire frame of transmitted chirps), and so forth.

With spatial grouping, the sensor data may be grouped based on azimuth, elevation, antenna elements, polarization, by different radars on the platform, among others. In an embodiment, the group size may be preconfigured, such as small, large, a plurality of small groups, and so forth.

In an embodiment, very fast detection (e.g., per chirps) 512 may be applied to the grouped data. For example, in very fast detection 512, action potentials are identified from the reflected signals in the group, based on per chirp. A reflected signal may be classified as an action potential (also referred to as complete action potential) when it behaves in a particular manner, such as exceeding a specific amplitude, power, etc.

In another embodiment, coherent integration 508 or non-coherent integration 510 may be applied to the grouped data prior to fast paced or slow-paced detection 514. In an embodiment, this step optimizes the signal to noise ratio (SNR), reducing noise in the signal, or extracting the signal to attain a high SNR value, thereby making the signal ready for fast paced or slow-paced detection 514.

Coherent integration 508 initially averages the signal and subsequently calculates its strength (power), taking into account the phase of the signal. Coherent integration 508 may encompass algorithms such as Fast Fourier Transform (FFT), beamforming, or other high-resolution techniques. Non-coherent integration 510 calculates the strength (power) of the signal before averaging, but forfeits the phase information of the signal. Non-coherent integration 510 may involve algorithms like absolute or power calculations and summation.

Once the integration is completed, fast paced or slow-paced detection 514 is performed on the integrated grouped signals. In an example, fast paced detection aims to identify the action potentials per subframe from the reflected signals, whether they were integrated coherently or non-coherently. In another example, slow paced detection focuses on identifying the action potentials per frame from the reflected signals.

An action potential is classified as a reflected signal that reaches or surpasses a predetermined threshold like exceeding a specific power level. Thus, in fast paced detection, each subframe may contain a multitude of reflected signals, where at least one signal qualifies as an action potential. Similarly, in slow paced detection, each frame may consist of a variety of reflected signals, with at least one signal being recognized as an action potential.

Action potential-based detector 516 determines the number of successful detections per group, based on action potentials per chirp, per subframe, or per frame. In an example, action potential-based detector 516 may determine object detection per chirp, i.e., very fast-paced detection. This implies that if M responses (reflected signals) to chirps out of N transmitted chirps for a spatial and/or temporal group comprise complete action potentials, object detection is determined.

In another example, object detection is determined per subframe (e.g., fast paced detection) or frame (e.g., slow paced detection). In such cases, when M out of N subframes (or frames) (of transmitted integrated chirps) receive corresponding subframes (or frames) of reflected signals which include a threshold number of complete action potentials, an object is detected. Alternatively, when there are fewer than M successful detections out of N groups, a false positive, i.e., noise, is detected.

In an embodiment, action potential-based detector 516 may determine a probability of detection and/or a probability of false alarm. In an embodiment, each group of data makes a hard decision by the probability of detection and the probability of false alarm For M successful detections in N groups, in an example, calculating the hard decision includes an assumption that all detections on different groups are conditionally independent, and the probability of detection and probability of false alarm are the same for all of the groups. Thus, the maximum likelihood of detection will be based on the assumption that there are M successful detections out of N groups. In another example, the calculating the hard decision can include an assumption that multipath effects over spatial or temporal domain is changing. In yet another example, an assumption can include that interference and/or jammer in the environment will change. In another example, an assumption can include that target reflectivity of a target during a particular scan time can change. Calculating the hard decision with these assumptions can improve the performance of the system. In an embodiment, the grouping of data, the threshold for M (e.g., number of successful detections required), the size of N (e.g., size of groups), etc., may be adjusted in subsequent iterations to increase the probability of detection and/or decrease the probability of false alarm.

User feedback or feedback from other sensors 520 may be received to train the action potential-based detection system. For example, presence of jammer or interference from other sensors, or reflection from an object which has a sudden change in position, may affect how sensor data is grouped (spatially and/or temporally) in subsequent detections. Such feedback may be incorporated as hyperparameters 518 for subsequent iterations of the process.

Figure 6:
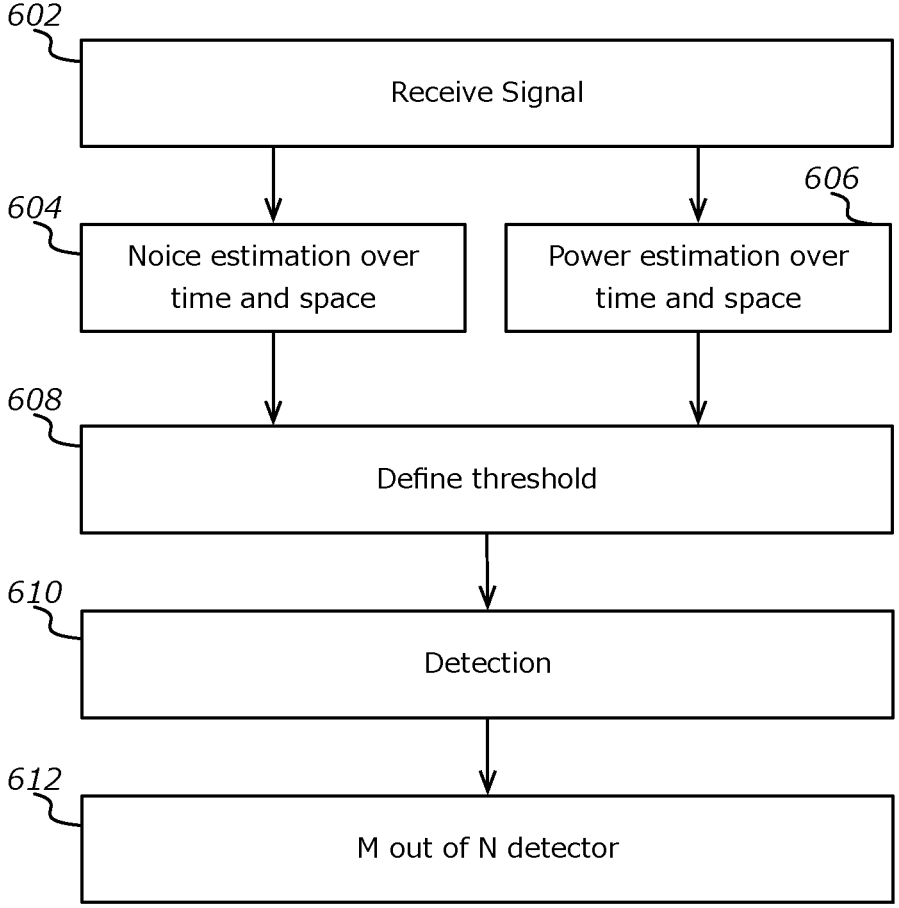
FIG. 6 illustrates an example process of an action potential-based detection system in accordance with an alternate embodiment.

FIG. 6 illustrates an example process of an action potential-based detection system, in which aspects of the various embodiments can be implemented. In embodiments, the method steps or techniques depicted and described herein can be performed in a processor comprising one or more of action potential-based detection system 120 as illustrated in FIG. 1, the method steps being encoded as processor-executable instructions in a non-transitory memory of one or more computing devices. The techniques of FIG. 6 and other process steps described herein may be implemented in an operating system kernel, in a separate user process, in a library package bound into network applications, on a specially constructed machine, on an application-specific integrated circuit (ASIC), or a field programmable gate array (FPGA). The process may comprise additional steps, fewer steps, and/or a different order of steps without departing from the scope of the invention as would be apparent to one of ordinary skill in the art.

In this example, a reflected signal is received 602 from the environment. The reflected signal may be received in response to transmitted pulses, also known as 'chirps,' subframe layer signals (which include integrated chirps spanning a temporal unit referred to as a 'subframe'), or frame layer signals (integrated chirps spanning a larger temporal unit know as a 'frame'), and the like. These temporal units of chirps, subframes, and frames provide a basis for temporal grouping of the reflected signals. Concurrently, spatial grouping can also be implemented based on parameters such as azimuth, elevation, or polarization.

In an embodiment, the performance of the detection system can be influenced by various environmental factors. These include multipath effects, which is the propagation phenomenon that results in radio signals reaching the receiving antenna by two or more paths, interference from other signals, or jammers present in the environment. Additionally, the reflectivity of the target object, which refers to the ability of the object to reflect the transmitted signals back to the sensor, can also impact the detection process. In various embodiments, these factors can dynamically change over both spatial and temporal domains.

In one embodiment, the radar system can determine the type of integration to be used for grouping the signals based on environmental conditions. Environmental conditions may include, but are not limited to, weather conditions, terrain properties, and multipath effects. For instance, in a situation where multipath effects are severe due to the nature of the environment, such as in an urban landscape with numerous reflective surfaces, the radar system may opt for non-coherent integration to better handle phase inconsistencies.

As an example, due to the multipath effect, a power variation might be observed from different parts of a distributed object with as little as 4 mm distance (corresponding to a wavelength at 77 GHz). Similarly, a power variation of up to 15 dB could occur from antenna elements in an array spaced 4 mm apart, again due to the multipath effect. It is generally inefficient to rely on very low power received signals for object detection, even if they are processed or integrated. Thus, to enhance the signal quality, estimation of the noise (e.g., noise power) 604 and/or power 606 of the received signal is performed over both time and space.

In another embodiment, the radar system may determine the type of integration to be used based on the characteristics of the target. Characteristics of the target may include, but are not limited to, the size, shape, material, and velocity of the target. For instance, for a small, high-speed target, the radar system might employ coherent integration to maintain phase information and provide better target resolution.

The system defines 608 a threshold for identifying a valid object. This threshold could relate to noise or power levels, for instance. Techniques such as the Constant False Alarm Rate (CFAR) algorithm, commonly used in radar systems to detect target returns against a background of noise, clutter and interference, can be used to set this threshold.

In an embodiment, the radar system can determine the type of integration to be used based on the interference and jamming conditions in the environment. These conditions can be determined by the presence and characteristics of other signal sources or reflectors in the environment. For instance, in a high-interference environment, the radar system may opt for non-coherent integration, which can be more robust to such interference.

Detection 610 of an object per group can be determined. For example, each reflected signal is compared with the established threshold to identify an action potential, which is essentially a valid target signal. A received signal is classi- fied as an action potential when it meets or surpasses this threshold. For each group, a certain minimum number of action potentials must be detected to consider it as a suc- cessful detection.

In the situation M successful detections are obtained out of N groups, the system establishes 612 that a valid object (target) has been detected. In the situation the number of successful detections falls below M out of N groups, the system infers the presence of noise or a false alarm.

Figure 7:
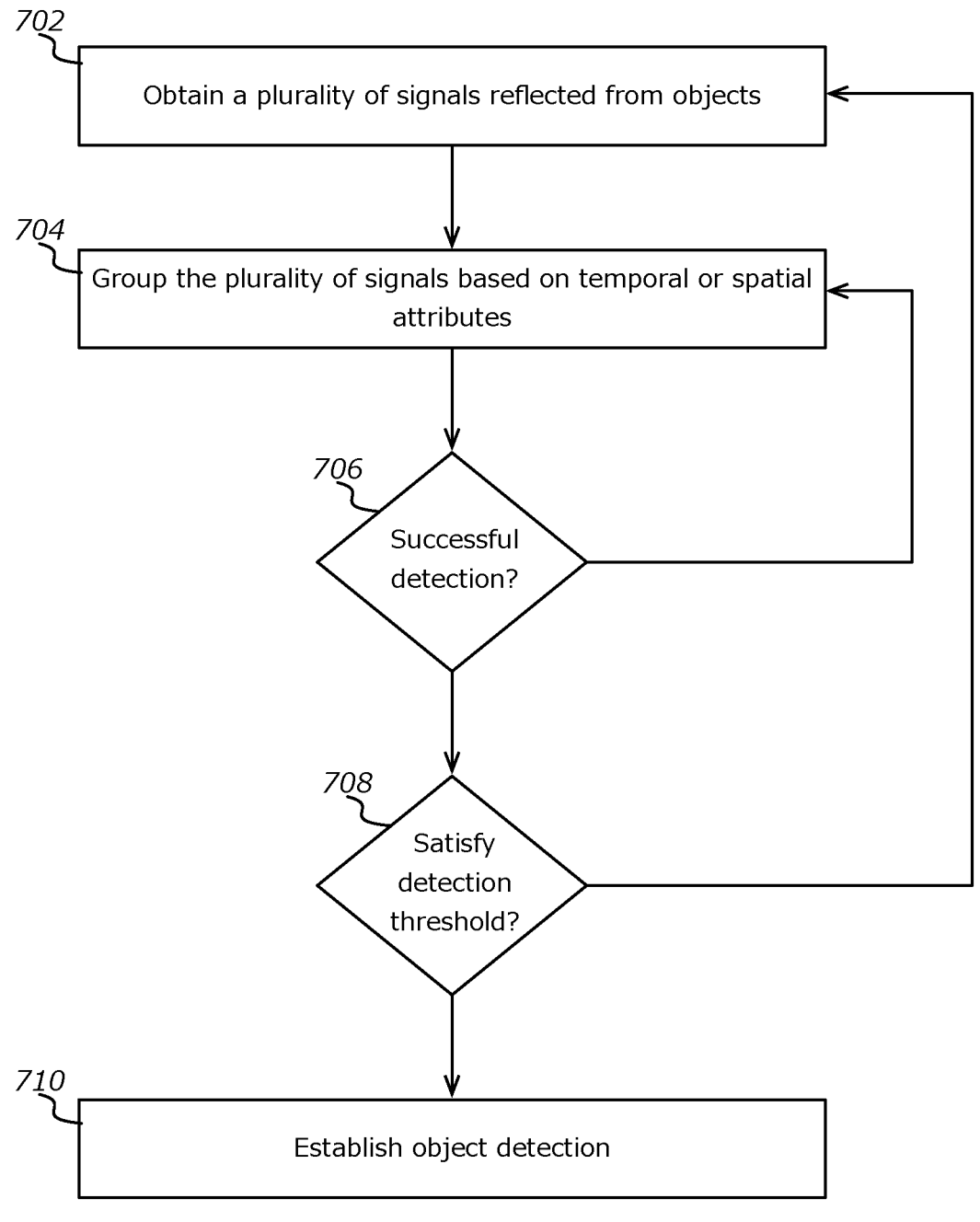
FIG. 7 illustrates an example process of an action potential-based detection system in accordance with an alternate embodiment.

FIG. 7 illustrates an example process of an action poten- tial-based detection system in accordance with various embodiments. As described, as action potential-based detec- tion system (e.g., action potential-based detection system 120) is operable to optimize object detection, particularly in dense environments. The action potential-based detection system groups reflected signals into 'N' temporal or spatial clusters. Temporally, the grouping could be per chirp, sub- frame, or frame, each representing different levels of system operation. Spatially, groupings can be based on attributes like azimuth, elevation, doppler, or polarization.

For each group, the system evaluates the detection poten- tial using two thresholds: the action potential threshold (signal strength within a group) and the detection threshold (minimum number of groups with potential targets). A group registers successful detection if at least one reflected signal surpasses the action potential threshold. To confirm a valid target, the system considers the number of groups ('M') with successful detections. If 'M' exceeds a predetermined detec- tion threshold, the source of the reflected signals is deemed a valid object. Upon successful detection, the system marks the object for further processing or notification.

In this example, the process starts at step 702 with the system obtaining a plurality of signals reflected from objects within an environment, responsive to a plurality of chirps. At step 704, the plurality of signals are grouped into a plurality of groups based on their temporal or spatial attributes. In an embodiment, when the signals are derived from pulses transmitted at different time intervals, then temporal group- ing is selected. When the signals originate from different spatial zones, spatial grouping is selected. In an embodi- ment, the decision can include analyzing and labeling or otherwise classifying the signals prior to grouping. This decision allows the action potential-based detection system to adapt its detection approach according to the character- istics of the incoming signals, thereby maximizing the accuracy and efficiency of object detection. At step 706, the system determines whether at least one group includes a successful detection. In an embodiment, a successful detec- tion can occur when at least one signal satisfies an action potential threshold. In the situation the group does include a successful detection, the process proceeds to step 708; otherwise, the process returns to step 704 to process the next group of signals. At step 708, the system determines whether the number of groups having a successful detection satisfies a detection threshold. In the situation it does, the process goes to step 710, where an object detection is established. If not, the process ends or returns to step 702 to obtain the next set of signals.

Hardware Architecture

Generally, the techniques disclosed herein may be imple- mented on hardware or a combination of software and hardware. For example, they may be implemented in an operating system kernel, in a separate user process, in a library package bound into network applications, on a spe- cially constructed machine, on an application-specific inte- grated circuit (ASIC), or on a network interface card.

Software/hardware hybrid implementations of at least some of the embodiments disclosed herein may be imple- mented on a programmable network-resident machine (which should be understood to include intermittently con- nected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose com- puters associated with one or more networks, such as for example an end-user computer system, a client computer, a network server or other server system, a mobile computing device (e.g., tablet computing device, mobile phone, smart- phone, laptop, or other appropriate computing device), a consumer electronic device, a music player, or any other suitable electronic device, router, switch, or other suitable device, or any combination thereof. In at least some embodi- ments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 8:
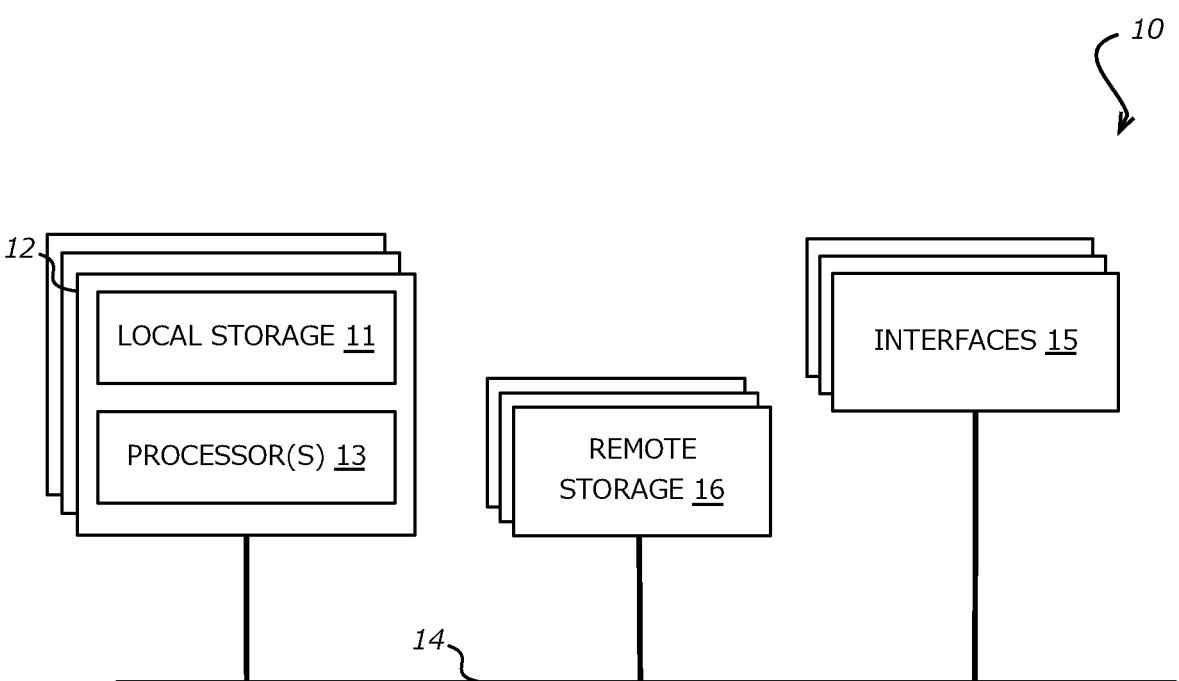
FIG. 8 illustrates components of a computing device that supports an embodiment of the present invention.

Referring now to FIG. 8, there is shown a block diagram depicting an exemplary computing device 10 suitable for implementing at least a portion of the features or function- alities disclosed herein. Computing device 10 may be, for example, any one of the computing machines listed in the previous paragraph, or indeed any other electronic device capable of executing software- or hardware-based instruc- tions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appro- priate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a JAVA virtual machine or equivalent, or files containing higher level code that may be executed by the computer using an interpreter (for example, scripts written in Python, Perl, Ruby, Groovy, or any other scripting language).

Figure 9:
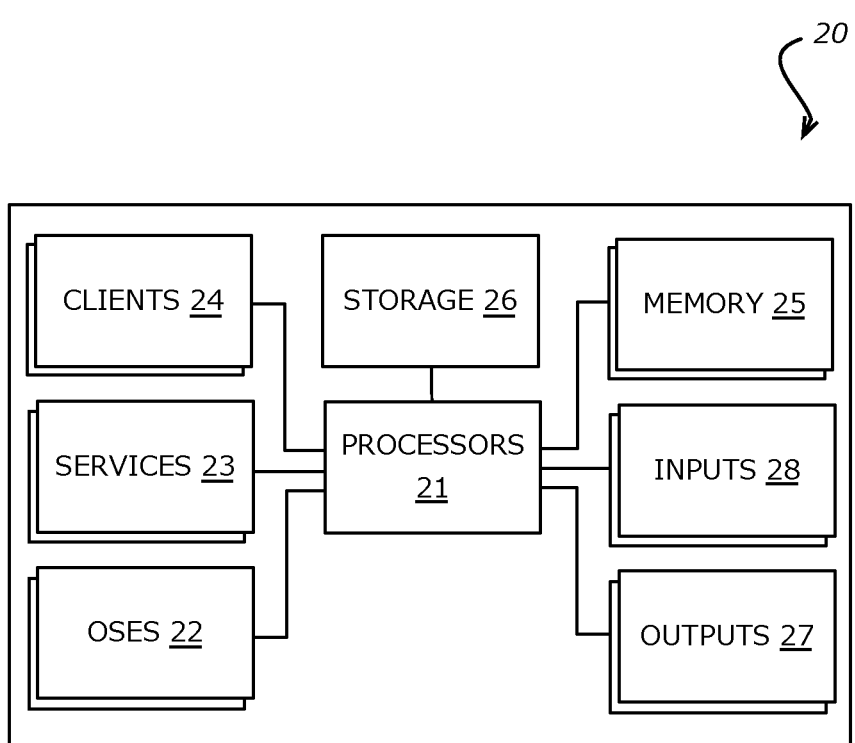
FIG. 9 illustrates an exemplary architecture of a system that supports an embodiment of the present invention.

In some embodiments, systems may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
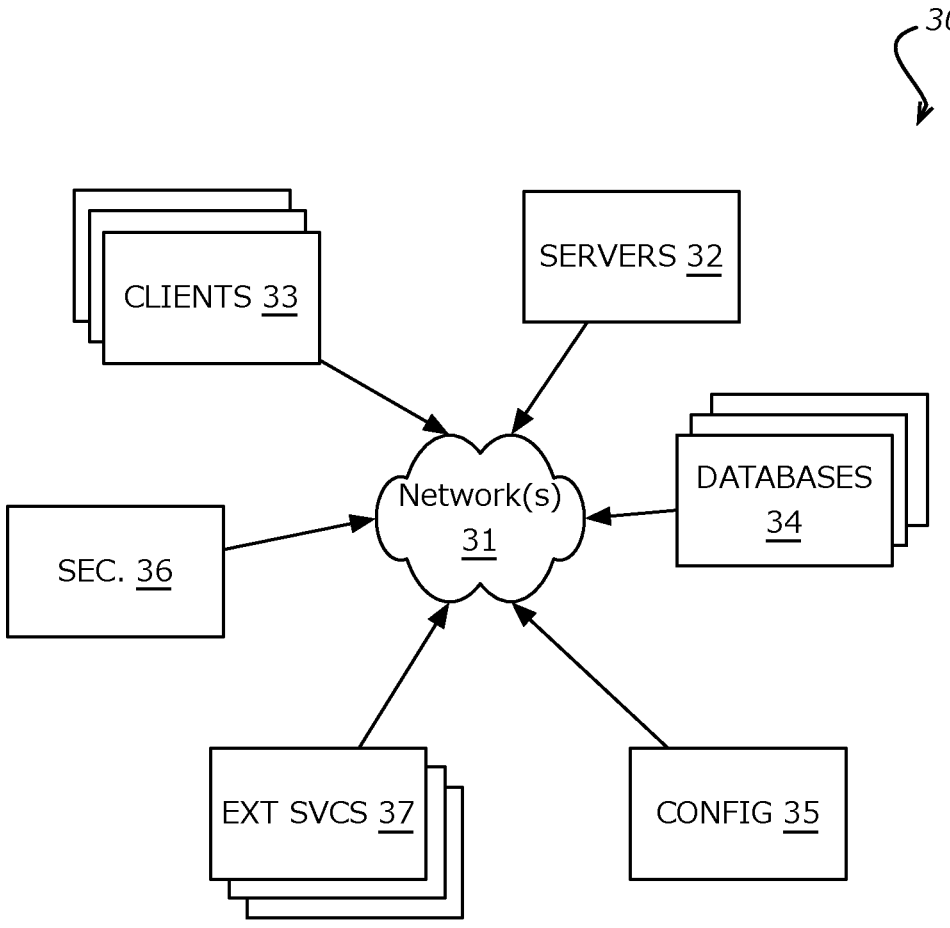
FIG. 10 illustrates another exemplary architecture of a system that supports an embodiment of the present invention.

In some embodiments, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CAS SANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 11:
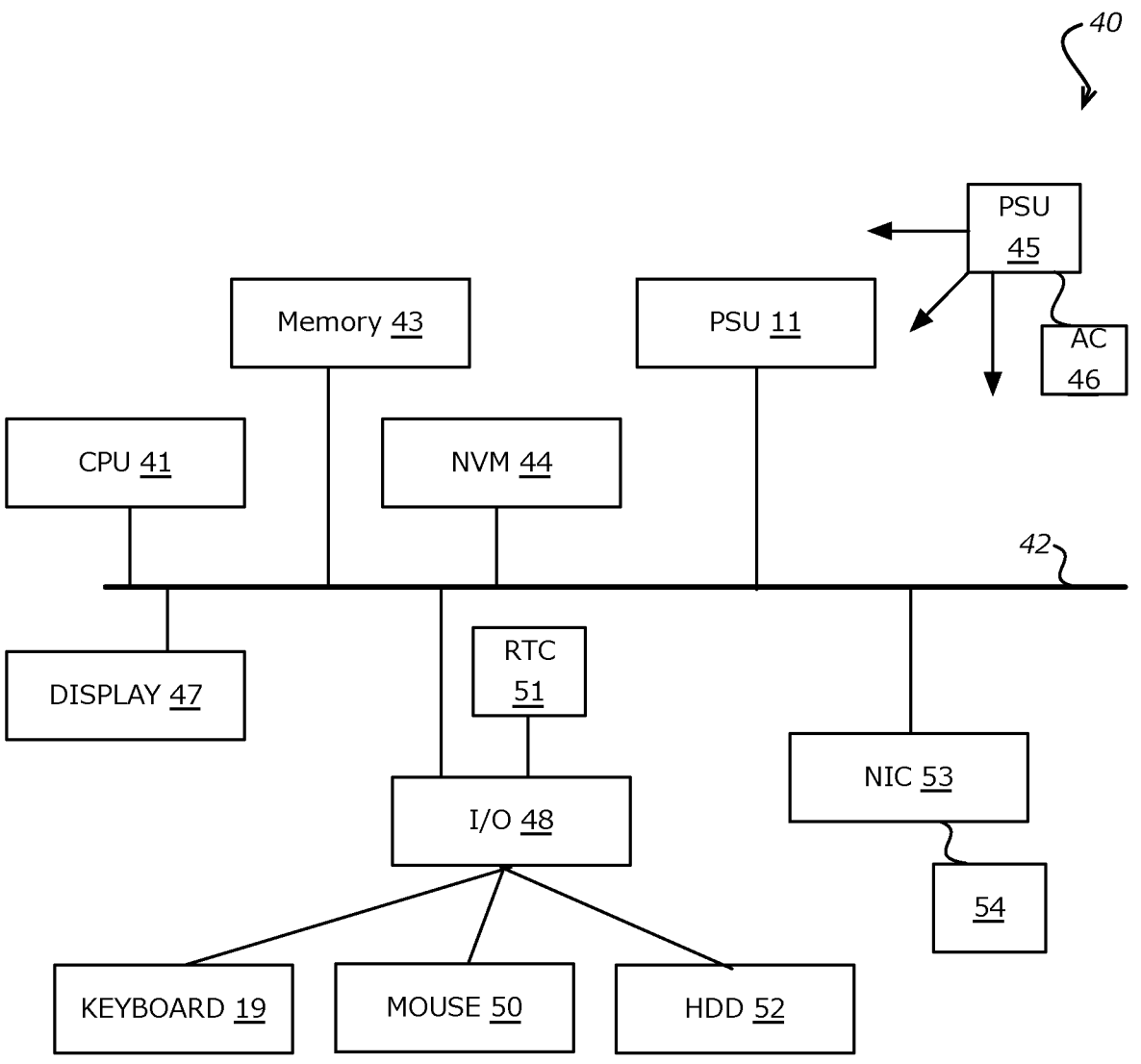
FIG. 11 illustrates components of a computer system that supports an embodiment of the present invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A radar system for object detection in an environment, comprising:
a radar transmitter, configured to emit a plurality of chirps to the environment;
a radar receiver, configured to collect a plurality of signals reflected from objects within the environment to generate a single observed frame of the environment, the plurality of signals being responsive to the plurality of chirps;
a processor; and
a memory device including instructions that, when executed by the processor, enable the radar system to:
group the plurality of signals within the single observed frame into a plurality of groups based on both respective temporal attributes and spatial attributes;
determine whether at least one group includes a successful detection, the successful detection comprising at least one signal in the at least one group exceeding an action potential threshold, wherein the action potential threshold is associated with a minimum signal strength or signal-to-noise ratio required to classify the at least one signal as a potential target within the at least one group;
determine whether a number of groups having a successful detection exceeds a detection threshold; and
establish an object detection within the single observed frame when the number of groups having a successful detection exceeds the detection threshold.

2. The radar system of claim 1, wherein the instructions, when executed, further enable the radar system to:
adapt the plurality of groups and the detection threshold based on feedback from system sensors showing presence of jammer, interference, or reflection from an object which has a sudden change in position.

3. The radar system of claim 1, wherein the instructions, when executed, further enable the radar system to:

determine the plurality of signals are derived from pulses transmitted at different time intervals; and
group the plurality of signals based on respective temporal attributes.

4. The radar system of claim 1, wherein the instructions, when executed, further enable the radar system to:
determine the plurality of signals originate from different spatial zones; and
group the plurality of signals based on respective spatial attributes.

5. The radar system of claim 1, wherein the spatial attributes comprise at least a distribution of radars on a platform from which the plurality of signals are received.

6. The radar system of claim 1, wherein the temporal attributes comprise time domain characteristics of the plurality of signals, wherein the time domain characteristics include at least one of per chirp data or per subframe data.

7. The radar system of claim 1, wherein the instructions, when executed, further enable the radar system to:
integrate the plurality of chirps based on one of a subframe or frame.

8. The radar system of claim 1, wherein the instructions, when executed, further enable the radar system to:
integrate the plurality of groups based on one of coherent integration or non-coherent integration.

9. The radar system of claim 8, wherein the instructions, when executed to integrate the at least one signal within the plurality of groups based on coherent integration, further enable the radar system to:
average the at least one signal; and
calculate power of the at least one signal based on a phase of the at least one signal.

10. The radar system of claim 8, wherein the instructions, when executed to integrate the at least one signal within the plurality of groups based on non-coherent integration, further enable the radar system to:
calculate power of the at least one signal without taking into account a phase of the at least one signal; and
average the at least one signal.

11. The radar system of claim 8, wherein the instructions, when executed, further enable the radar system to:
determine a type of integration to be used for the plurality of groups based on at least one of environmental conditions, target characteristics, or interference and jamming conditions, wherein the environmental conditions comprise multipath effects, the target characteristics include target reflectivity, and the interference and jamming conditions include presence of other signal sources or reflectors in the environment.

12. The radar system of claim 1, wherein the instructions, when executed, further enable the radar system to:
calculate a probability of detection and a probability of false alarm based on a number of successful detections out of total groups within the single observation frame.

13. A computer-implemented method, comprising:
obtaining a plurality of signals reflected from objects within an environment to generate a single observed frame, the plurality of signals being responsive to a plurality of chirps;
grouping the plurality of signals within the single observed frame into a plurality of groups based on respective temporal and spatial attributes, the temporal attributes comprising time domain characteristics of the plurality of signals per subframe data;
determining at least one group includes a successful detection, the successful detection comprising at least one signal exceeding an action potential threshold, wherein the action potential threshold is associated with a minimum signal strength or signal-to-noise ratio required to classify the at least one signal as a potential target within the at least one group;

determining a number of groups having a successful detection exceeds a detection threshold; and establishing an object detection within the single observed frame when the number of groups having a successful detection exceeds the detection threshold;

adapting the plurality of groups based on feedback from system sensors showing presence of jammer or interference.

14. The computer-implemented method of claim 13, further comprising:

determining whether the plurality of signals are derived from pulses transmitted at different time intervals or originate from different spatial zones; and grouping the plurality of signals based on a respective attribute of derivation, wherein temporal signals are grouped based on temporal attributes, and spatial signals are grouped based on spatial attributes.

15. The computer-implemented method of claim 13, further comprising:

integrating the plurality of groups based on one of coherent integration or non- coherent integration.

16. The computer-implemented method of claim 15, further comprising:

determine a type of integration to be used for the plurality of groups based on at least one of environmental conditions, target characteristics, or interference and jamming conditions, wherein the environmental conditions comprise multipath effects, the target characteristics include target reflectivity, and the interference and jamming conditions include presence of other signal sources or reflectors in the environment.

17. A non-transitory computer readable storage medium storing instructions that, when executed by at least one processor of a computing system, causes the computing system to:

obtain a plurality of signals reflected from objects within an environment to generate a single observed frame, the plurality of signals being responsive to a plurality of chirps;

group the plurality of signals within the single observed frame into a plurality of groups based on respective temporal or spatial attributes, the temporal attributes comprising time domain characteristics of the plurality of signals per subframe data;

determine at least one group includes a successful detection, the successful detection comprising at least one signal exceeding an action potential threshold, wherein the action potential threshold is associated with a minimum signal strength or signal-to-noise ratio required to classify the at least one signal as a potential target within the at least one group;

determine a number of groups having a successful detection exceeds a detection threshold;

establish an object detection within the single observed frame when the number of groups having a successful detection exceeds the detection threshold; and adapting the plurality of groups based on feedback from system sensors in subsequent object detections.

* * * * *